United States Patent [19]

McCartney

[11] 4,352,055

[45] Sep. 28, 1982

[54] AC VARIABLE VOLTAGE SOURCE UTILIZING PULSE WIDTH MODULATION

[75] Inventor: Thomas McCartney, Deerfield, Ill.

[73] Assignee: ONEAC Corporation, Bannockburn, Ill.

[21] Appl. No.: 200,433

[22] Filed: Oct. 24, 1980

[51] Int. Cl.³ .............................................. G05F 1/30
[52] U.S. Cl. ..................................... 323/263; 323/271
[58] Field of Search ............... 323/235, 237, 247, 254, 323/258, 259, 262, 263, 268, 271, 272, 301, 328, 332, 339, 340, 342, 343, 344

[56] References Cited

U.S. PATENT DOCUMENTS

| | | | |
|---|---|---|---|
| 3,263,157 | 7/1966 | Klein | 323/258 |
| 3,281,652 | 10/1966 | Perrins | 323/271 X |
| 3,600,664 | 8/1971 | Goldberg et al. | 323/263 |
| 3,600,668 | 8/1971 | Goldberg | 323/263 |

FOREIGN PATENT DOCUMENTS 1510644  5/1978  United Kingdom ................. 323/272

Primary Examiner—A. D. Pellinen
Attorney, Agent, or Firm—Mason, Kolehmainen, Rathburn & Wyss

[57] ABSTRACT

An AC variable voltage source utilizing pulse width modulation is provided that converts an input of two AC voltage waveforms of the same frequency but opposite phase into a single AC voltage output of the same frequency but with a variable amplitude. The variable voltage source includes a control voltage input that determines the amplitude of the AC voltage output. The two AC input voltage waveform are provided by buck and boost windings of an AC input transformer having a primary winding connected to an AC source. The variable voltage source utilizes phase switch stages each connected to a respective one of the buck or boost windings and including back to back power MOSFETS. Each of the phase switch stages is controlled at a switching frequence much higher than the AC input frequency with the duty cycle of operation of each of the phase switch stages determining the amplitude of the controlled output. In one arrangement, an inductor is provided in series with each of the phase switch stages for operation in a current fed mode. In another arrangement, an inductor is provided in series with the common output of the phase switch stages for operation in a voltage fed mode. For line regulation of an AC line, the control voltage is a feedback signal derived from the AC regulated output. For a proportional controller, the control voltage is a DC voltage proportional to the amplitude of the desired AC output voltage.

21 Claims, 3 Drawing Figures

AC VARIABLE VOLTAGE SOURCE UTILIZING PULSE WIDTH MODULATION

BACKGROUND OF THE INVENTION

A. Field of the Invention

The present invention relates generally to the field of voltage regulators and variable voltage sources and more particularly to an AC variable voltage source utilizing pulse width modulation techniques to provide a continuously variable AC voltage in response to an AC voltage input.

B. Description of the Prior Art

Various power supplies, regulators, inverters and converters are known that utilize various techniques such as phase control, pulse width modulation, switching of winding taps, and saturable coils for obtaining regulated supply voltages at various levels.

For example, switching regulators of one type utilize pulse width modulation of a series switching device to provide control of an average power output. This type of switching regulator is typically a DC to DC regulator. However, AC to AC converters are also known wherein the AC input voltage is rectified, an intermediate DC control stage with pulse width modulation control or other switching control is utilized to regulate the rectified AC input voltage, and a DC to AC inverter stage is provided to convert the regulated DC voltage to an AC output.

Further, various buck and boost regulators and other arrangements are known which provide line regulation and control of output voltage by automatically switching taps on transformer windings by discrete steps to provide a measure of output control in response to variable input conditions.

Another form of voltage regulation control is achieved by arrangements utilizing saturable ferromagnetic transformers or variable inductance devices to provide output control.

While the above-described arrangements and techniques are generally suitable for their intended use, the various arrangements suffer from various drawbacks in that they are inefficient, or merely control the output voltage in discrete steps, or require AC to DC to AC conversion with synthesis of the AC output waveform.

SUMMARY OF THE INVENTION

Accordingly, it is a principal object of the present invention to provide a new and improved AC variable voltage source utilizing pulse width modulation that avoids one or more of the shortcomings or drawbacks of the prior art approaches described hereinbefore.

It is another object of the present invention to provide a new and improved AC variable voltage source utilizing pulse width modulation that converts an AC voltage input into an AC voltage output of the same frequency as the input source and having a selectively and continuously controlled amplitude while maintaining high efficiency without an intermediate DC stage.

It is a further object of the present invention to provide an AC variable voltage source capable of use in an AC line regulation circuit or as a proportional controller utilizing pulse width modulation controlled switches that are operated at a frequency much higher than the AC line input frequency with the control switches controlling the connection of the AC input source to the output of the variable voltage source in accordance with a control input.

Briefly, these and other objects of the present invention are achieved by providing an AC variable voltage source utilizing pulse width modulation that converts an input of two AC voltage waveforms of the same frequency but opposite phase into a single AC voltage output of the same frequency but with a variable amplitude. The variable voltage source includes a control voltage input that determines the amplitude of the AC voltage output. The control voltage input in various applications of the variable voltage source is either a DC voltage or a sensed AC voltage derived from the system controlled by the variable voltage source. The variable voltage source is useful for various applications including AC line regulation and proportional control of an AC voltage to a power circuit including motors and the like. When the variable voltage source is utilized for line regulation of an AC line, the control voltage to the variable voltage source is derived from an AC sample of the AC regulated output. When the variable voltage source is utilized as a proportional controller, the control voltage is typically a DC voltage that is proportional to the amplitude of the desired AC output voltage of the variable voltage source. Accordingly the variable voltage source in various applications functions either on an open loop basis or in a closed loop control system. In one application for line regulation, the output of the variable voltage source is connected to selectively add or subtract from the line voltage that is to be regulated and the AC control voltage is sensed from the regulated line output. In an application as a proportional controller, the variable voltage source provides an output as a continuously controlled AC supply voltage and the input in one specific embodiment is full AC line voltage. The variable voltage source utilizes pulse width modulated switches which are operated at a frequency much greater than the AC line frequency. The pulse width modulated switches control the selective connection of the two AC input voltage waveforms to the output of the variable voltage source. The output of the variable voltage source is filtered to remove the high frequency switching components.

The invention both as to its organization and method of operation together with further objects and advantages thereof will best be understood by reference to the following specification taken in connection with the accompanying drawings.

DESCRIPTION OF THE PREFERRED EMBODIMENT

Figure 1:
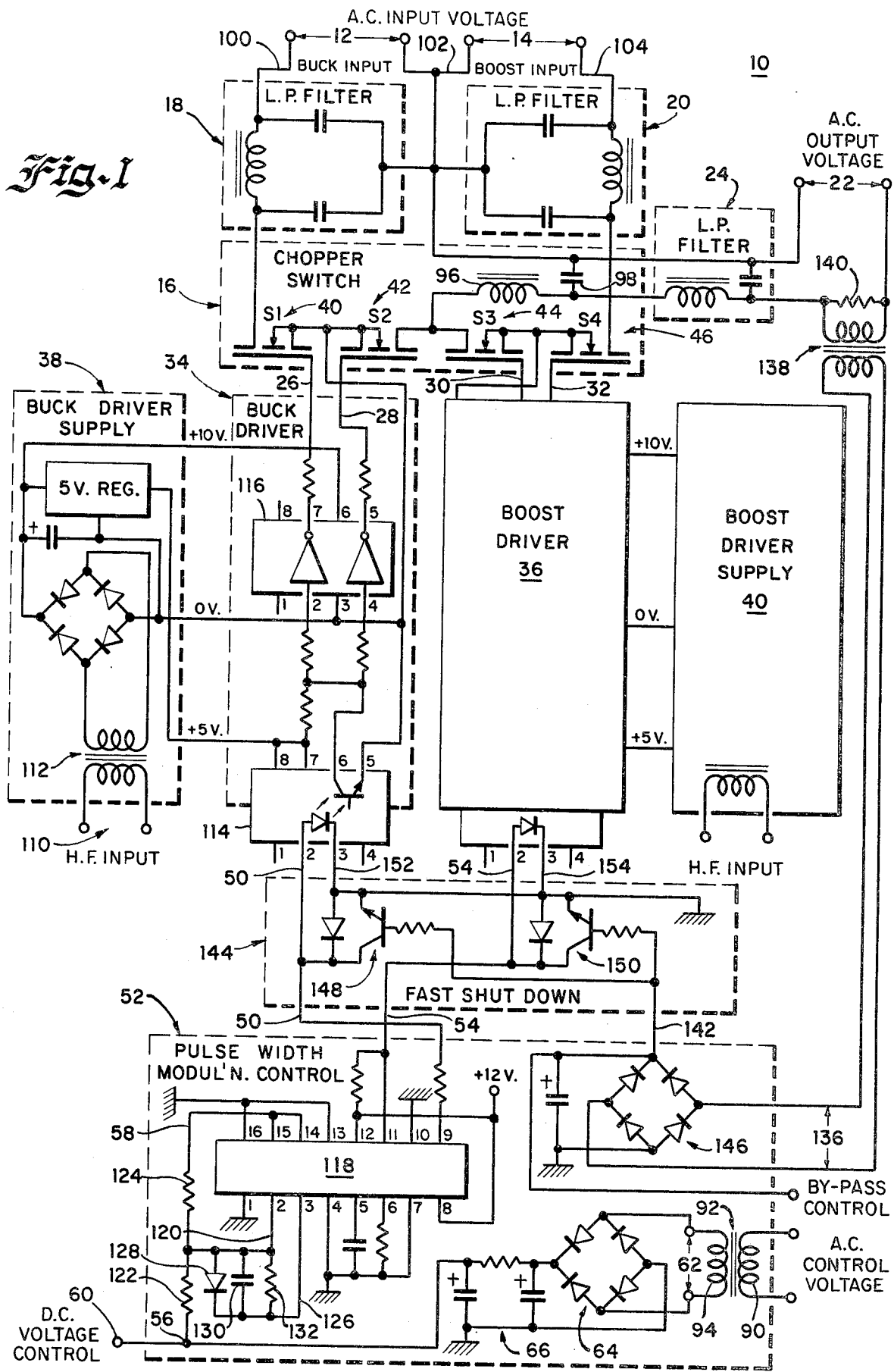
FIG. 1 is a schematic, logic and block diagram of the AC variable voltage source in accordance with the principles of the present invention.

Referring now to FIG. 1, the variable voltage source of the present invention referred to generally at 10 includes two AC input voltage waveforms 12, 14 that are connected to a chopper switch stage 16 through respective low pass filter stages 18, 20. While the filter stages 18 and 20 are provided in the preferred embodiment, it should also be understood that in alternate arrangements the inputs 12 and 14 may be connected directly to the chopper switch stage 16. The inputs 12, 14 referred to respectively as the buck and boost inputs, are AC input voltages of the same frequency but of opposite phase. For example, in AC control applications for the regulation or control of a 110 volt 60 hz. supply line, the inputs 12, 14 are 60 hz. AC waveforms of a predetermined amplitude as explained in more detail hereinafter.

The chopper switch stage 16 operates at a frequency much higher than the frequency of the inputs 12, 14 and provides an AC output voltage 22 of the variable voltage source 10 through a low pass output filter 24. The chopper switch stage 16 is controlled by means of pulse width modulation switching control inputs 26, 28, 30 and 32. The switch control inputs 26 and 28 are provided by a buck driver stage 34 and the switch control inputs 30 and 32 are supplied by a boost driver stage 36. The buck driver stage 34 and the boost driver stage 36 are provided with isolated DC power supplies from a buck driver supply 38 and a boost driver supply 40, respectively. The chopper switch stage 16 includes buck switches 40 and 42 referred to as S1 and S2 and boost switches 44 and 46 referred to as S3 and S4.

The operational state of the buck switches S1 and S2 are controlled by the switch control inputs 26 and 28 respectively from the buck driver stage 34. Further the boost switches S3 and S4 are controlled by the switch control inputs 30 and 32 respectively from the boost driver stage 36. The operational state of the buck driver stage 34 and thus the state of the switches S1 and S2 of the chopper switch stage 16 are controlled by a first output 50 of a pulse width modulation control stage 52. The operational state of the boost driver 36 and thus the state of the switches S3 and S4 are controlled by a second output 54 of the pulse width modulation control stage 52.

The pulse width modulation control outputs 50 and 54 are complementary outputs having complementary on and off duty cycles under the selective control of the pulse width modulation control stage 52. The pulse width modulation control stage 52 operates at a frequency F2 which is much greater than the frequency F1 of the input voltages at 12, 14. For example, in a specific embodiment F2 is 50 khz. for an AC line application where F1 is 60 hz.

The pulse width modulation control stage 52 compares a DC control voltage input at 56 with an internal reference voltage at 58 and appropriately controls the duty cycle of output signals 50 and 54 as the DC control voltage 56 varies with respect to the reference 58.

The DC control 56 to the pulse width modulation control stage 52 in various arrangements is either supplied from a DC control input 60 or is derived from an AC control voltage input 62 in accordance with the various applications of the variable voltage source 10. In accordance with the application of the variable voltage source 10 shown in FIG. 2, the AC control voltage 62 is processed by a rectifier stage 64 and a filter stage 66 to obtain the control voltage input 56.

Figure 2:
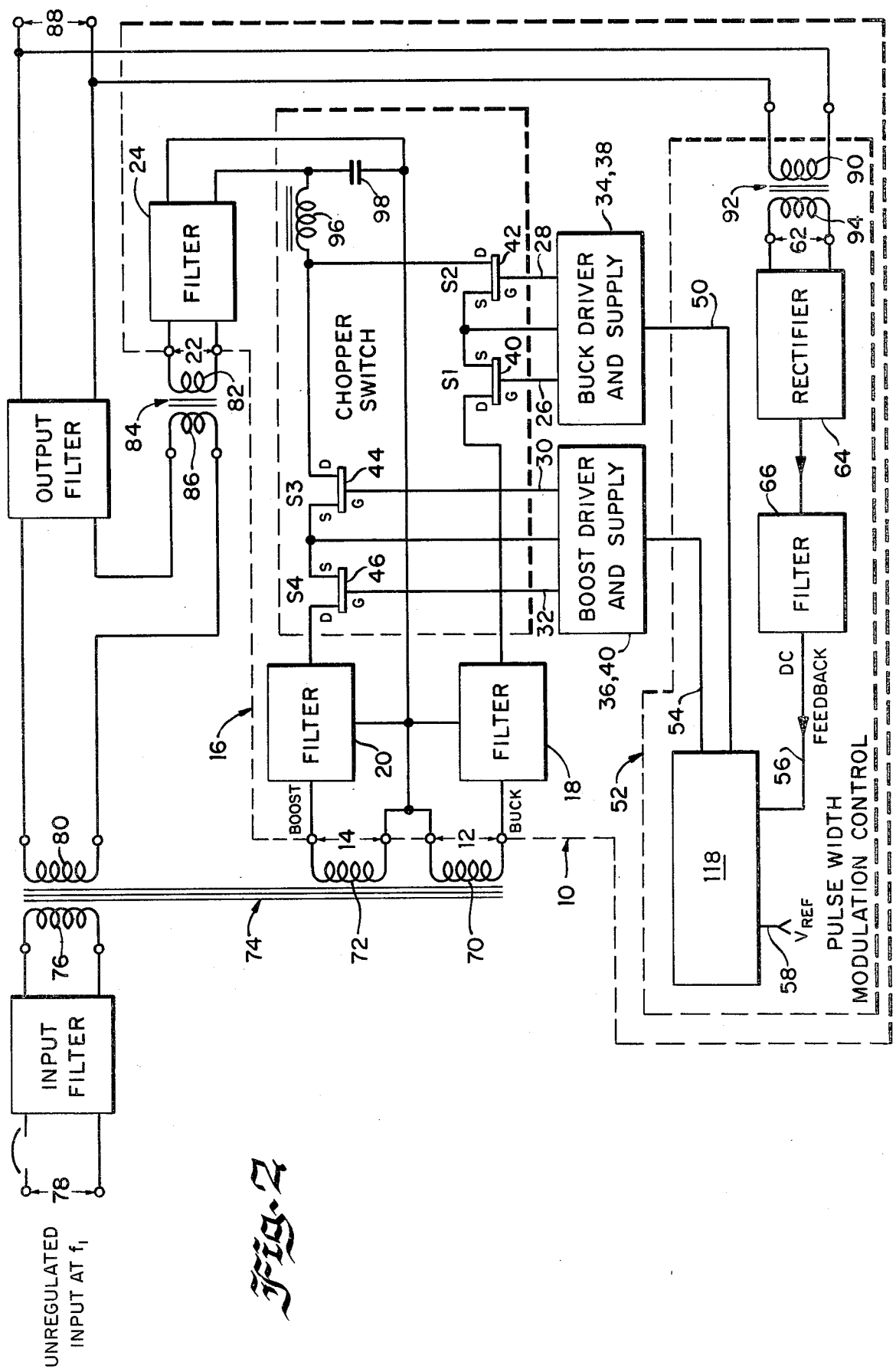
FIG. 2 is a schematic, logic and block diagram representation of the variable voltage source of FIG. 1 in a circuit application as either an AC voltage regulator or as a proportional controller and illustrating control of the circuit in the secondary winding of the AC input transformer.

Referring to the application of the variable voltage source 10 in FIG. 2 wherein like reference characters refer to like elements, and considering first an AC line voltage regulation application, the variable voltage source 10 receives input voltages 12, 14 from a buck winding 70 and a boost winding 72 respectively. The buck and boost windings 70 and 72 are appropriately arranged on an AC input transformer 74. The AC input transformer 74 includes a primary winding 76 connected through an input filter and a circuit breaker or fuse or the like to a non-regulated AC supply source at 78 of frequency F1. For example, in a typical circuit application, the AC source 78 is a 110 volt, 60 hz. supply. The transformer 74 also includes a secondary winding 80. The turns ratio between the primary and secondary windings 76 and 80 are appropriately selected in accordance with the input and output voltages that are to be controlled. Further, the turns ratio between the primary winding 76 and the boost and buck winding 72, 70 are selected in accordance with the particular control application and the degree of line regulation desired.

In the arrangement of FIG. 2, the regulation provided by the variable voltage source 10 is provided in the secondary of the transformer 74. Thus, the output voltage 22 of the variable voltage source 10 is connected to a primary winding 82 of a transformer 84 and the secondary winding 86 of the transformer 84 is connected in series with the secondary 80 of the input transformer 74 to provide the regulated output connection at 88. In accordance with desired filtering characteristics of the regulated circuit, an output filter as shown in FIG. 2 may also be connected in the regulated output 88. Further, the turns ratio of the transformer 84 may be selected in accordance with the particular circuit application in combination with the turns ratio of the transformer 74 to provide the desired degree of regulation.

The regulated output at 88 is connected to the primary winding 90 of a transformer 92 and the secondary winding 94 of the transformer 92 is connected to the AC control voltage input 62 of the variable voltage source 10. Thus in accordance with an appropriate turns ratio of the transformer 92, the regulated output at 88 is sensed by the variable voltage source 10 and rectified and filtered to provide the control voltage 56 in a closed loop feedback system as shown in FIG. 2.

Considering now the operation of the variable voltage source 10 and the circuit of FIG. 2, the variable voltage source 10 by means of the sensed output voltage at the regulated output 88 controls the duty cycle of the switch pairs S1, S2 and S3, S4 to appropriately supply a compensating voltage at output 22 in either a buck or boost polarity sense through transformer 84 to maintain the desired regulated output at 88 in a closed loop circuit arrangement.

Thus, if the sensed voltage at regulated output 88 tends to rise above the nominal desired AC output level, the variable voltage source 10 alters the duty cycle of the chopper switch stage such that the buck switches S1, S2 are appropriately energized for a larger than fifty percent duty cycle and the boost switches S3, S4 are actuated at less than a fifty percent duty cycle resulting in an appropriate voltage being developed through transformer 84 in a bucking sense to lower the regulated output at 88. Thus during the closed loop operation of the variable voltage source 10 in the arrangement of FIG. 2, the regulated output at 88 is accurately maintained at the desired level in a closed loop system with appropriate loop gain for the desired regulation accuracy.

The chopper switch stage 16 includes a current feed inductor 96 and a charging capacitor 98 such that the switch pairs S1, S2 and S3, S4 alternately are actuated to supply current through the inductor 96 to charge the capacitor 98 at the operating frequency of the pulse width modulation control stage 52. Thus with the buck switches S1, S2 energized, the buck input 12 is connected to the current feed inductor 96 with a corresponding charge developed across the capacitor 98. Similarly, when the boost switches S3, S4 are energized, the boost input at 14 is connected to feed current to the inductor 96 and a corresponding charge across the capacitor 98. Accordingly the net charge on the capacitor 98 is dependent on the duty cycle of the switch pairs S1, S2 and S3, S4 in the chopper switch stage 16 with the net charge across the capacitor 98 being zero for a fifty percent duty cycle of each of the switch pairs. Accordingly when the AC input transformer at secondary 80 provides an amplitude at exactly the level of the set point of the regulated output 88, the duty cycle will be fifty percent and the charge on capacitor 98 will be zero. Accordingly, the output voltage at 22 will also be zero.

Considering a second application of the arrangement of FIG. 2, the variable voltage source 10 is also operable to function as a proportional controller for the output voltage at 88 with an appropriate DC control input at 60 providing a DC control input 56 in place of the AC feedback voltage at 62. Thus in accordance with the turns ratio of the various transformers, the buck and boost windings are utilized to provide a desired waveform at the source frequency and of source characteristics with an amplitude as selected by the level of the control input at 60. Accordingly, any range of desired levels at output voltage at 88 are obtainable with a sinusoidal waveform for proportional control applications such as the control of a motor at a specified amplitude operating level with respect to the input level at source input 78.

However, it should be understood that the variable voltage source 10 as shown in FIG. 1 is capable of operation as a proportinal control with the input voltage at 12, 14, the control input at 60 and the output at 22 being provided to the device to be proportionally controlled. For example, the amplitude of the inputs at 12, 14 determine the degree of proportional control provided at the output 22. Further, a transformer such as 84 in FIG. 2 may also be utilized at the output 22 to provide additional range of control in combination with the amplitude of the inputs at 12, 14.

Turning again to FIG. 1 and considering the detailed circuitry and operation of the variable voltage source 10, the buck switches S1 and S2 in a specific embodiment are power mosfets connected back to back to form an AC switch such that they are switched on or off together in accordance with the control inputs, 26, 28; the control inputs 26, 28 having identical simultaneous states. The drain connection of the mosfet switch S1 is connected to one end 100 of the buck input 12. The source connections of S1 and S2 are interconnected and the drain connection of switch S2 is connected to one end of the inductor 96. The gate connections of the switches S1 and S2 are respectively connected to the control inputs 26, 28.

The second end 102 of the buck input 12 and one side of the boost input 14 are connected to the capacitor 98 and also to one end of the output connection 22. The second end 104 of the boost input 14 is connected to the drain connection of the boost switch S4. The source connections of the switch pair S3 and S4 are interconnected. The drain connection of the switch S3 is connected to the drain of switch S2 and one end of the inductor 96. The gate connections of the boost switch pair S3 and S4 are respectively connected to the boost control inputs 30, 32. The inductor 96 and the capacitor 98 are interconnected in series between the buck input side 102 and the drain connections of the switches S2, S3. The common connection of the inductor 96 and the capacitor 98 form the other output connection of the output 22. The input of filters 18, 20 and the output filter 24 remove the high frequency switching components of the chopper switch 16 and prevent any high frequency switching components from appearing at either the inputs 12, 14 or the output 22 of the variable voltage source 10. The high operating frequency of the variable voltage source 10 allows the filtering components of filters 18, 20 and 24 to be small and economical.

Considering now the buck driver stage 34, 10 volt DC, 5 volt DC and zero volt DC voltages are supplied to the buck driver 34 as isolated voltages from the buck driver supply stage 38. Due to various voltages appearing across the switches S1, S2 during the various switching states and the necessity to reference or float these switches S1, S2 at the power line voltages, the switch control lines 26, 28 require isolation from the remaining circuitry of the variable voltage source 10. The buck driver supply stage 38 receives a high frequency input supply at 110 to an isolation transformer 112. The high frequency input at 110 is provided by a high frequency oscillator (not shown). The high frequency voltage at the secondary of the isolation transformer 112 is rectified and filtered and appropriately regulated by the buck driver supply stage 38 to provide the DC supply voltages to the buck driver stage 34. The buck driver stage 34 includes an opto-isolator stage 114 connected to the pulse width modulation control signal 50 from the pulse width modulation control stage 52. The opto-isolator stage 114 drives a buffer stage 116 including individual driver circuits to provide the switch control signals 26, 28 to the switches S1, S2, respectively. When the control line 50 is active, the opto-isolator state 114 is actuated to provide appropriate drive signals through the buffer stage 116 to the switch control lines 26, 28. The common source connection between the switches S1, S2 is connected to the zero volt DC supply line. The boost driver stage 36 is identical to the buck driver stage 34 and the boost driver supply 40 is identical to the buck driver supply 38 and provides isolated DC supply voltages to the boost driver stage 36.

The pulse width modulation control stage 52 includes a pulse width modulation integrated circuit stage 118 having a comparator input 120. The input 120 is connected through an input resistor 122 to the input control voltage 56. Further, the input 120 is connected through an input resistor 124 to the internal reference voltage at 58 of the integrated circuit stage 118. The internal comparator stages of the integrated circuit 118 control two complementary output stages to provide the appropriate varying duty cycles of operation on the control signals 50, 54. The internal comparator of the integrated circuit stage 118 compares the input signal at 120 with the internal reference signal. A compensation input 126 is connected to the comparator input 120 through the parallel combination of a zener diode 128, a capacitor 130 and a resistor 132. The capacitor 130 and the resistor 132 control the response time of the internal comparator of the stage 118.

In one specific embodiment, the pulse width modulation control stage 52 includes a current sensing input at 136. The current sensing input 136 is provided by the secondary winding of a transformer 138. The primary winding of the transformer 138 is connected across an output current sensing resistor 140. The current sensing resistor 140 is connected in series with the output line at the AC output voltage 22 from the inductor 96. If the current sensed by the resistor 140 exceeds a predetermined output limit, the pulse width modulation control stage 52 in response to the current sensing input 136 provides a fast shutdown control signal 142 to a fast shutdown stage 144. Specifically, the pulse width modulation control stage 52 includes a rectifier/filter stage 146 that provides a control signal 142 in response to the current sense input 136.

Referring now to the fast shutdown stage 144, a buck transistor control stage 148 and a boost transistor control stage 150 are responsive to the fast shuwn down control signal 142. The buck transistor control stage 148 in response to the fast shut down signal 142 inhibits the operation of the opto-isolator stage 114 of the buck driver 34. In this condition, the buck driver stage 34 is not responsive to the control input 50 and the buck driver signals 26, 28 are inhibited so as to gate off the switches S1, S2 in the chopper switch stage 16. Similarly, the boost transistor control circuit 150 of the fast shut down stage 144 is arranged to limit operation of the boost driver stage 36 over the shut down control line 154 to inhibit operation of the switches S3, S4 of the chopper switch 16. Thus if excessive current is sensed by the resistor 140, the variable voltage source 10 is shut down.

Figure 3:
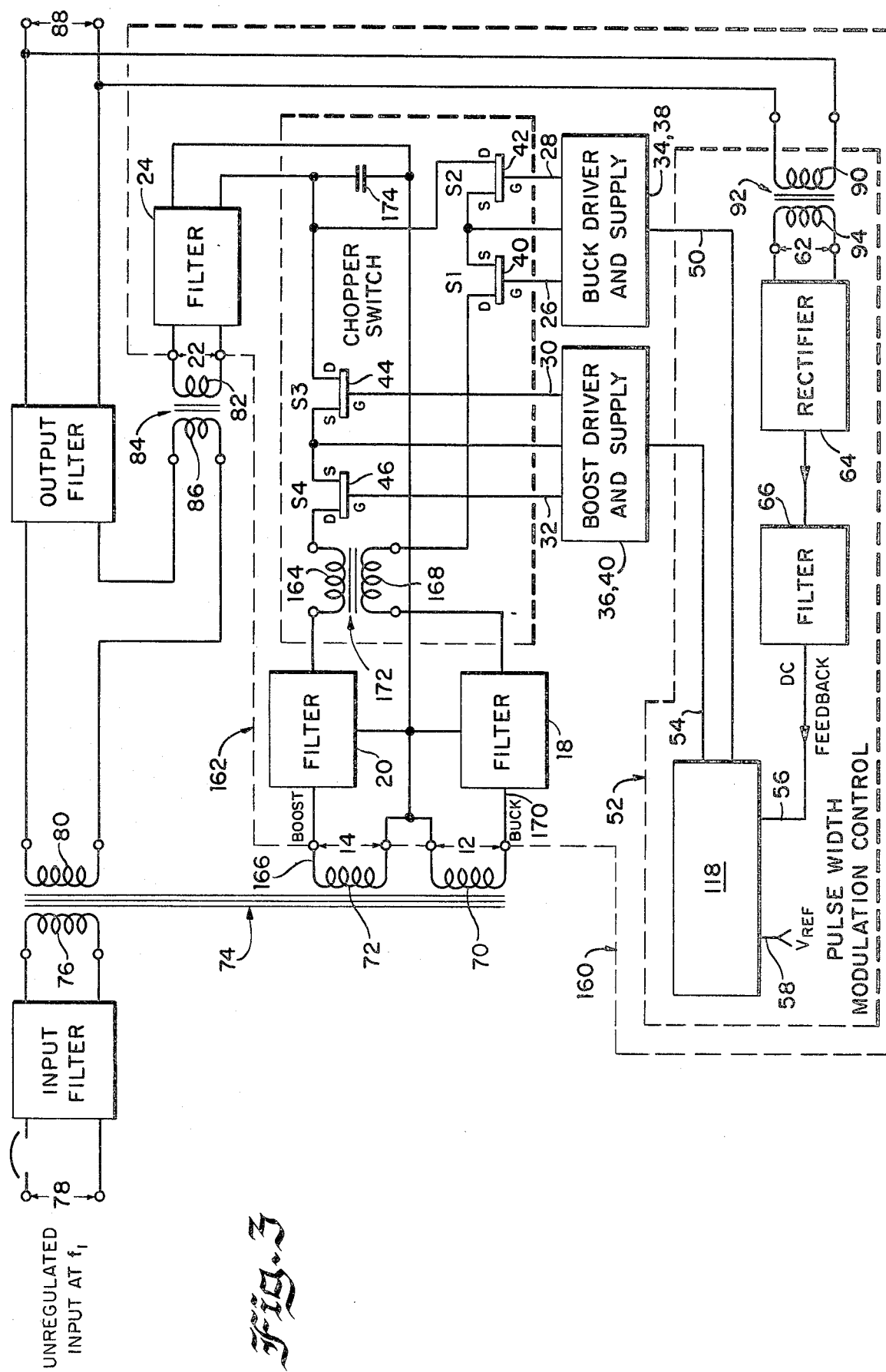
FIG. 3 is a schematic, logic and block diagram representation of a modified form of the variable voltage source of FIG. 1 in a circuit application providing either AC voltage regulation or proportional output control and illustrating control of the application circuit in the primary winding of the AC input transformer.

Referring now to FIG. 3 wherein like reference characters refer to like elements of FIGS. 1 and 2, the variable voltage source 160 of the present invention is shown in a modified form from that of FIGS. 1 and 2 and in either a circuit application for providing a regulated voltage at 88 or as a proportional controller application with an output at 88. The variable voltage source 160 of FIG. 3 includes a current fed chopper switch stage 162 instead of the voltage fed chopper stage 16 of FIGS. 1 and 2. The remaining portions of the variable voltage source 160 are identical to the variable voltage source 10 of FIGS. 1 and 2 as depicted by the like reference characters.

The switches S1, S2 and S3, S4 of FIGS. 1 and 2 are effectively arranged to switch voltage and thus control the flow of current into the current feed inductor 96 and charge the capacitor 98 as shown therein and described hereinbefore. The chopper switch stage 162 of FIG. 3 includes a boost inductance winding 164 connected between one end 166 of the boost winding 72 at input 14 and the drain connection of switch pair S3, S4. Similarly, a buck inductance winding 168 is connected between the drain connection of switch S1 of the buck switch pair S1, S2 and one end 170 of the buck winding 70 at input 12. Of course, the filters 18, 20 may be provided in the arrangement of FIG. 3 between the respective buck and boost winding inputs and the conductors 164 and 168 similarly to the filter connections in FIGS. 1 and 2. The inductance windings 164 and 168 in the preferred arrangement are disposed on a common core 172 which in operation aids to avoid saturation effects. However, it should also be understood that the inductance windings 164 and 168 may be arranged on separate cores. A capacitor 174 is connected across the output of the variable voltage source 160. The capacitor 174 is connected between the drain connection of the switch S3 and the common connection of the boost winding 72 and the buck winding 70. In all other respects, the function and operation of the variable voltage source 160 is identical to that of the variable voltage source 10 of FIGS. 1 and 2 with the pulse width modulation control stage 52 in response to the feedback control input 56 to control operation of the chopper switch stage 162 by means of the control outputs 50 and 54 and the boost driver 36 and the buck driver 34.

The circuit application of FIG. 3 also includes regulation of the output 88 by means of connection of the variable voltage source 162 in the primary circuit of the input source. Specifically, the output 22 of the control circuit 162 is coupled to the transformer 84 with the secondary winding 86 of the transformer 84 being connected in series with the primary winding 76 of the transformer 74 and the unregulated input at 78.

It should be understood that the variable voltage source 10 with voltage fed chopper switch 16 and the variable voltage source 160 with current fed chopper switch 162 can be utilized with either regulation in the primary or secondary path of the input transformer.

In a specific embodiment the following circuit components of the variable voltage sources 10 and 160 have been found useful in one implementation of the present invention. However, these circuit components are intended to be merely illustrative and should not be interpreted in any limiting sense:

| CIRCUIT ELEMENT | MANUFACTURER'S PART DESIGNATION |
|---|---|
| Pulse Width Modulation Control Circuit 118 | Motorola TL494 |
| Opto-Isolator 114 | Hewlett Packard HCPL-2601 |
| Buffer 116 | Motorola MMH0026 |

While there has been illustrated and described several embodiments of the present invention, it will be apparent that various changes and modifications thereof will occur to those skilled in the art. It is intended in the appended claims to cover all such changes and modifications as fall within the true spirit and scope of the present invention.

What is claimed as new and desired to be secured by Letters Patent of the United States is:

1. An AC variable voltage source comprising:
 means responsive to an AC input source for providing a controlled output of variable amplitude and of the same waveform characteristics as said input source, said output providing means comprising electronic switch means responsive to switch control signals for selectively switching in phase and out of phase waveforms of said input source at a switching frequency at least several orders of magnitude higher than the frequency of said input source, and output filter means responsive to said electronic switch means for filtering out the high frequency switching components of said switching frequency; and switch control means for generating said switch control signals in response to a control input, said switch control signals being effective to control the duty cycle of said switch means at said switching frequency, the magnitude of said control input determining the duty cycle of said switch means and the amplitude of said controlled output, said variable output providing means further comprising two AC phase inputs, said AC input source providing an AC input to each of said two AC phase inputs, each of said AC inputs being of predetermined amplitude, said two AC inputs being of opposite relative phase, said electronic switch means including first and second phase switch stages, each of said first and second phase switch stages being responsive to a respective one of said two AC phase inputs, each of said phase switch stages including two power MOSFETS each having a drain, a source and a gate control connection, each of said source connections of said MOSFETS in each phase switch stage being connected to each other, each of said gate control connections being connected to one of said switch control signals, each of said phase switch stages being connected between a respective one of said AC phase inputs and said output filter means.

2. The variable voltage source of claim 1 wherein said switch control means comprises a pulse width modulation control circuit including a comparator circuit, said comparator circuit comparing said control input with a reference signal input.

3. The variable voltage source of claim 2 wherein said output of said output providing means is connected in a buck-boost sense with said AC input source to provide a controlled AC output supply source.

4. The variable voltage source of claim 3 further comprising feedback sensing means responsive to said AC output source for providing said control input to said switch control means.

5. The variable voltage source of claim 4 wherein said feedback sensing means comprises means for outputting an AC feedback signal proportional to said AC output source and means for rectifying said AC feedback signal to provide said control input as a varying DC control voltage.

6. The variable voltage source of claim 1 or 5 wherein said variable output providing means further comprises an inductance winding and a capacitor, said capacitor being connected across the input to said output filter means, said inductance winding being connected in series between said output filter means and common drain connection of said phase switch stages.

7. The variable voltage source of claim 1 or 5 wherein said variable output providing means further comprises output transformer means connected to said output filter means for outputting said controlled output, said AC input source includes a transformer having a primary winding connected to an uncontrolled AC input, a secondary winding connected in series with said controlled output, and buck and boost windings providing said AC inputs to said two AC phase inputs of said providing means.

8. The variable voltage source of claim 7 wherein said AC input source includes a transformer having a primary winding connected to an uncontrolled AC input, a secondary winding connected in series with said controlled output, and buck and boost windings providing said AC inputs to said two AC phase inputs of said providing means.

9. The variable voltage source of claim 7 wherein said AC input source includes a transformer having a primary winding connected in series with an uncontrolled AC input and said controlled output, a secondary winding providing said controlled AC output supply source, and buck and boost windings providing said AC inputs to said two AC phase inputs of said providing means.

10. The variable voltage source of claim 1 wherein each of said phase switch stages includes a drain connection of one of said mosfets being connected to a respective one of said AC phase inputs, the drain connection of each of said second mosfets of each phase switch stage being connected together and to said output filter means.

11. The variable voltage source of claim 1 wherein said providing means includes two inductance windings, each of said phase switch stages including the drain connection of one of said mosfets being connected together and to said output filter means, the drain connection of said second mosfet of each phase switch being connected through one of said inductance windings to a respective one of said AC phase inputs.

12. The variable voltage source of claim 1 wherein said switch control signals comprise a control signal lead being connected to each of said gate connections of said mosfets.

13. The variable voltage source of claim 1 or 5 wherein said switch control signals comprise two complementary output control signals, one output control signal being connected to a respective one of said phase switch stages, one of said output control signals being active during a first predetermined portion of the period of said switching frequency in accordance with said control input and said second of said output control signals being active during the remaining portion of the period of said switching frequency in accordance with said control input.

14. The variable voltage source of claim 1 further comprising means responsive to the current of said controlled output for selectively inhibiting operation of said switch means, said inhibiting means including means for sensing said current of said controlled output, said inhibiting means inhibiting operation of said switch means in response to said sensed controlled output current being greater than a predetermined maximum operating current.

15. The variable voltage source of claim 1 further comprising isolated supply and driver means responsive to said switch control signals for generating isolated switch control signals, said isolated supply and driver means comprising isolated power supply means and isolated driver means, said isolated power supply means providing power supply reference voltages to said driver means for isolating said switch means from said switch control means, said isolated driver means comprising optical isolation means responsive to said switch control signals and generating said isolated switch control signals.

16. AC line regulation apparatus comprising:
AC line transformer means responsive to an uncontrolled AC input source, said transformer means including a primary winding connected to said AC input source, a secondary winding, a buck winding providing an AC signal that is a predetermined proportion of the voltage across said primary winding and of opposite phase to said primary winding voltage, and a boost winding providing an AC signal that is a predetermined proportion of the voltage across said primary winding and in phase with said primary winding voltage;

high frequency chopper switch means connected to said buck and boost windings for selectively switching said AC signals from said buck and boost waveforms at a switching frequency higher than said frequency of said AC input source, said chopper switch means including buck switch means for switching said AC signal from said buck winding and boost switch means for switching said AC signal from said boost winding, said buck and boost switch means being controlled by switch control signals providing a predetermined variable buck switch means energizing signal during a first predetermined variable portion of the period of said switching frequency and a predetermined variable boost switch means energizing signal during a second predetermined variable portion of the period of said switching frequency, each of said buck and boost switch means including bidirectional switch means for providing a controlled conduction path, each of said bidirectional switch means including two power MOSFETS each having a drain, a source and a gate connection, each of said source connections of said MOSFETS in each bidirectional switch means being connected to each other, each of said gate connections being connected to one of said switch control signals;

output filter means connected to said buck and boost switch means for outputting a variable amplitude AC output voltage of the same waveform characteristics of said AC input source and for removing said high frequency switching components of said switch means; and switch control means responsive to a control input for generating said switch control signals, said switch control means being responsive to said control input to selectively vary the variable energizing portions of said switch control signals, said variable amplitude AC output voltage of said filter means being connected in series with one of said primary or secondary windings to provide a regulated AC output voltage from said AC line regulation apparatus.

17. The AC line regulation apparatus of claim 16 further comprising feedback sensing means responsive to said regulated AC output voltage for generating said control input.

18. The AC line regulation apparatus of claim 17 wherein said feedback sensing means comprises AC sensing means responsive to said regulated AC output voltage and means responsive to said AC sensing means for generating said control input as a varying DC control voltage.

19. An AC variable voltage source comprising:

means responsive to an AC input source for providing a controlled output of variable amplitude and of the same waveform characteristics as said input source, said output providing means comprising electronic switch means responsive to switch control signals for selectively switching in phase and out of phase waveforms of said input source at a switching frequency at least several orders of magnitude higher than the frequency of said input source, and output filter means responsive to said electronic switch means for filtering out the high frequency switching components of said switching frequency; and switch control means for generating said switch control signals in response to a control input, said switch control signals being effective to control the duty cycle of said switch means at said switching frequency, the magnitude of said control input determining the duty cycle of said switch means and the amplitude of said controlled output, said variable output providing means further comprising two AC phase inputs and two inductance windings, said AC input source providing an AC input to each of said two AC phase inputs, each of said AC inputs being of predetermined amplitude, said two AC inputs being of opposite relative phase, said electronic switch means including first and second phase switch stages, each of said first and second phase switch stages being responsive to a respective one of said two AC phase inputs, each of said phase switch stages including bidirectional switch means for providing a controlled conduction path, said controlled conduction path of each of said phase switch stages being connected in series with one of said inductance windings to said respective AC phase input.

20. The AC variable voltage source of claim 19 wherein each of said bidirectional switch means includes two power MOSFETS each having a drain, a source and a gate control connection, each of said source connection of said MOSFETS in each bidirectional switch means being connected to each other, each of said gate control connection being connected to one of said switch control signals.

21. The variable voltage source of claim 19 wherein said variable voltage providing means further comprises a capacitor being connected to the respective end of each of said controlled conduction paths opposite said respective inductance windings, said capacitor being connected across the input to said output filter means.

* * * * *